United States Patent
Lau

(10) Patent No.: US 9,544,640 B2
(45) Date of Patent: Jan. 10, 2017

(54) WIRELESS THEATER SYSTEM

(75) Inventor: Dannie C. Lau, Santa Clara, CA (US)

(73) Assignee: Harman International Industries, Incorporated, Stamford, CT (US)

(*) Notice: Subject to any disclaimer, the term of this patent is extended or adjusted under 35 U.S.C. 154(b) by 1095 days.

(21) Appl. No.: 13/038,905

(22) Filed: Mar. 2, 2011
(Under 37 CFR 1.47)

(65) Prior Publication Data
US 2012/0204213 A1 Aug. 9, 2012

Related U.S. Application Data

(60) Provisional application No. 61/309,835, filed on Mar. 2, 2010.

(51) Int. Cl.
*H04N 7/18* (2006.01)
*H04N 21/436* (2011.01)
*H04N 21/4363* (2011.01)

(52) U.S. Cl.
CPC ...... *H04N 21/436* (2013.01); *H04N 21/43615* (2013.01); *H04N 21/43635* (2013.01); *H04N 21/43637* (2013.01)

(58) Field of Classification Search
CPC ............ H04N 21/436; H04N 21/43615; H04N 21/43635; H04N 21/43637
See application file for complete search history.

(56) References Cited

U.S. PATENT DOCUMENTS

2005/0136990 A1* 6/2005 Hardacker et al. ........... 455/572
2006/0209892 A1* 9/2006 MacMullan et al. ......... 370/468

OTHER PUBLICATIONS

JVC Taking Out First Wireless Soundbar Sound System, the TH-BA3, Dec. 15, 2009, http://gadgets.softpedia.com/news/JVC-Taking-Out-First-Wireless-Soundbar-Sound-System-the-TH-BA3-6857-01.html.*

* cited by examiner

*Primary Examiner* — Yassin Alata
(74) *Attorney, Agent, or Firm* — Brooks Kushman P.C.

(57) ABSTRACT

A system and method for wireless transmission of high-definition audio and video signals include providing lossless raw video data wirelessly to a soundbar from a headunit to eliminate the multitude of wires that traditionally connect to a television in a home theater. In one embodiment, a wireless transmitter in the headunit transmits a wireless HDMI signal as the lossless raw video data.

20 Claims, 4 Drawing Sheets

WIRELESS THEATER SYSTEM

RELATED APPLICATION

This application claims the priority of U.S. provisional Application Ser. No. 61/309,835 titled WIRELESS THEATER SYSTEM, filed Mar. 2, 2010, which is incorporated in its entirety into this application by reference.

BACKGROUND OF THE INVENTION

1. Field of the Invention

This invention relates to home theater systems and more particularly home theater systems with wireless audio and video capabilities.

2. Related Art

The popularity of liquid crystal display (LCD) televisions has increased over the last few years, partially due to the improved picture quality and the ability to mount the LCD televisions on walls. But, as with any television, there are numerous connections to audio/video components and content providers that typically require wired connections. These wires limit the placement of the audio/video components to within a few feet of the television and make for an unsightly mess of wires.

Newer televisions have been made with HDMI connectors and have associated copy protection provided by the HDMI standards. In order to get the highest quality digital picture from a device such as a Blue-ray disc, HDMI connections must be made between the television and all of the components. This results in HDMI cables being required from the audio/video component to the television. Thus, if the television is mounted on the wall there are only two approaches for cabling the television. The first approach is running a HDMI cable up the wall and results in an unsightly cable being visible. The other approach is running the HDMI cable in the wall. This requires changing the structure of the house and often requires a carpenter or electrician to actually do the work.

A problem exists relative to wire placement and the necessity of locating the audio/video components in relative close proximity to the television. Attempts to resolve the problem have included in-wall wiring approaches, such as A-bus and other wired Ethernet cabling system approaches or 900 Mhz wireless analog speaker and video approaches. All of these approaches fail to solve all of the cabling problems and maintain the encrypted HDMI signal that has the superior picture quality.

Therefore, there is a need for providing a wireless theater system in which HDMI signals are maintained while allowing audio/video components to be placed anywhere in a room while reducing the cabling connecting to a television or other display.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a headunit is able to connect to other audio/video devices using HDMI connections along with other connections (audio, composite video, etc. . . . ). The headunit is able to process the digital audio and video signals and send raw video along with audio signals wirelessly to a soundbar. The sound bar may be a 5.1 surround sound bar that has a receiver to receive the raw video and analog signals and transport them to a television that is tethered via a cable, such as an HDMI cable. The wireless transmission of the video signal may be via a lossless protocol, such as wireless HDMI.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

Figure 1:
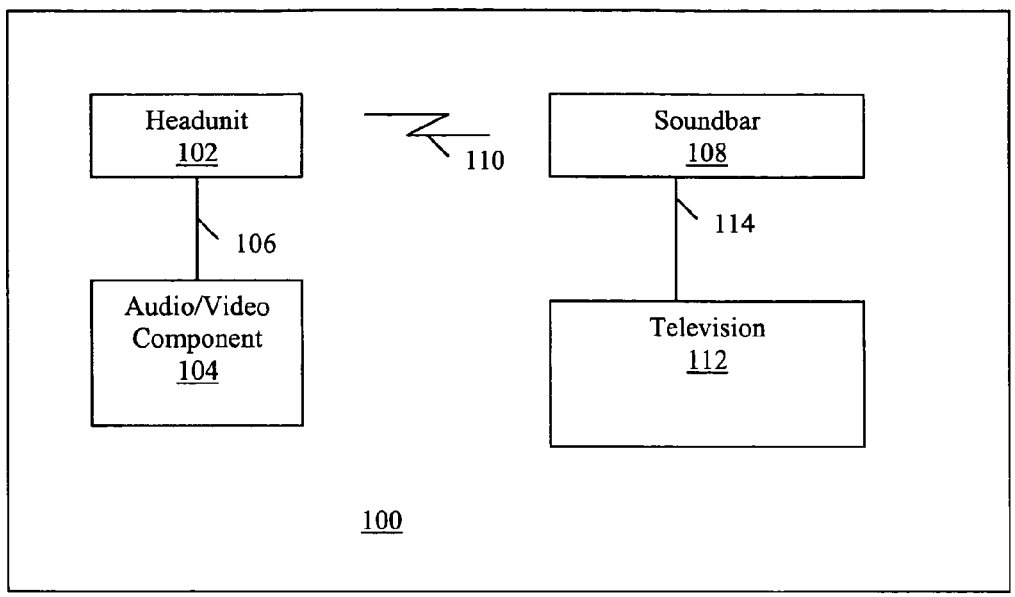
FIG. 1 is a block diagram of wireless theater system in accordance with an example implementation.

In FIG. 1, a block diagram of wireless theater system 100 in accordance with an example implementation is depicted. The wireless theater system 100 may have a headunit 102, one or more audio/video components 104, cabling 106, a soundbar 108, and television 112. The headunit 102 may act as a hub and connect to other audio/video components 104, such as Blue-Ray disc players, DVD player, cassette tape players, IPOD video players, media players, personal computers, karaoke machines, turntables, interactive toys, and video tape players. At least one of the audio/video components may be a HDMI capable device (i.e. the Blue-Ray disc player) and provide encrypted video content in addition to audio content. In other implementations, some of the audio/video components may be located within the headunit 102, such as a Blue-Ray disc player.

The headunit processes the video and audio content received over the HDMI cable and transmits the video and audio content as data via a wireless link 110 to a soundbar 108. The transmission may be done with a protocol such as wireless HDMI that transports the raw video or with a similar lossless protocol. A lossless protocol requires more bandwidth than may be provided by wireless data communication protocols such as wireless internet (WiFi). A lossless wireless protocol (lossless wireless signal), such as wireless HDMI, typically will require a bandwidth of 60 Gigahertz. Lossless transmission 108 maintains the integrity of the HDMI signal and the associated copy protection required by the HDMI standards.

The soundbar 108 receives the wireless HDMI signal and plays the audio via multiple speakers that may support 5.1 surround sound. The HDMI video signal may be passed from the soundbar 108 via a cable 114, such as a HDMI cable, to the television 112 or other display. In other implementations, the soundbar 108 may be connected to the television 112 via component cables, composite cables, or S-Video cables. Further, the television 112 may be, for example, a LCD television, tube television, computer display, or projector.

Figure 2:
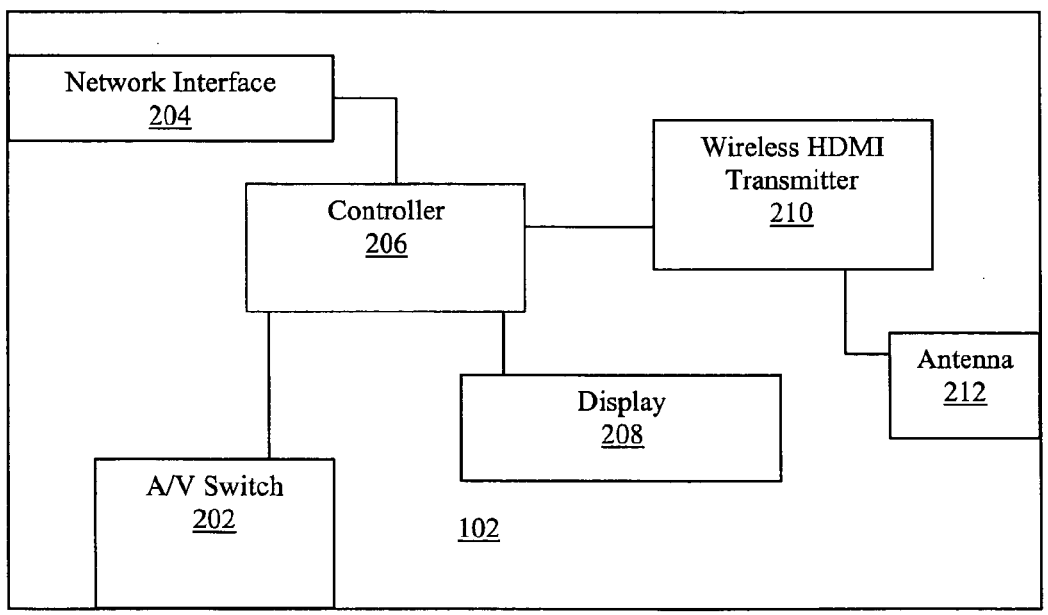
FIG. 2 is a block diagram of the headunit 102 of FIG. 1 in accordance with an example implementation.

Turning to FIG. 2, a block diagram of the headunit 102 of FIG. 1 in accordance with an example implementation is depicted. The headunit 102 may have an audio visual (a/v) switch 202, network interface 204, controller 206, display 208, wireless HDMI transmitter 210 and antenna 212. Audio/video components may connect to the headunit 108 via a/v switch 202. The a/v switch 202 may be capable of switching between different audio/video inputs and connections, such as HDMI connections, component connections, composite connections, and S-video connections. In other implementations, only one type of connections (such as HDMI) may be supported. In yet other implementations at least one audio/video component 214 may be integrated within the headunit 102 and connected internally to the a/v switch 202 and controller 206.

A controller 206 may be implemented with a digital signal processor, microprocessor, or other electrical circuits that may function as a controller. The controller 206 may process audio and video signals received from the a/v switch 202 and control the a/v switch that is selects the input audio/video signals. The controller 206 may have a video processor that aids in the scaling and graphic overlays for on screen displays. Further, the controller 206 may have an audio processor for processing the audio signals received at the headunit 102. A network interface 204 may be coupled to the controller 206 and receive digital data (including audio and video data) from a telephone network, data network (such as the internet), or infrared receiver. The controller 206 processes the different received signals and provides visual data via display 208. Examples of the visual data may include sound fields, selected input, volume level, equalizer bars, and power status. Audio, video and control data/signals for the soundbar 108 may be transmitted via a wireless connection 110 of FIG. 1. The controller 206 sends the audio, video, and control data/signals to the wireless HDMI transmitter 210 that transmits the data/signals via antenna 212 to the soundbar 108.

Figure 3:
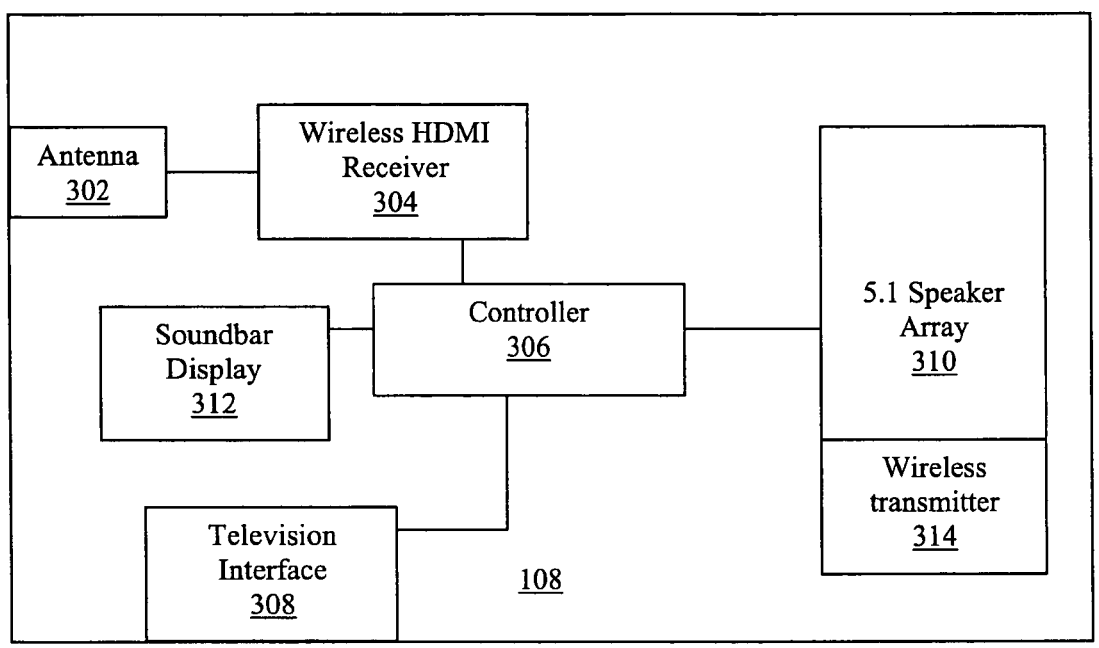
FIG. 3 is a block diagram of the soundbar 108 of FIG. 1 in accordance with an example implementation.

In FIG. 3, a block diagram of the soundbar 108 of FIG. 1 in accordance with an example implementation is depicted. The soundbar 108 may have an antenna 302, wireless HDMI receiver 304, controller 306, television interface 308, speaker array 310, and soundbar display 312. The wireless link 110 of FIG. 1 carries the lossless audio/video signal and is received by the soundbar 108 at the wireless HDMI receiver 304 via antenna 302. The controller 306 processes the data and signals from the wireless HDMI receiver 304 and transmits the respective audio signals and video signals to the television interface 308 and speaker array 310. The controller 306 may also have an audio processor for processing the audio signals received at the wireless HDMI receiver 304. Thus, a portion of the received data/signal may be sent to the speakers array 310. The controller 306 may also control a soundbar display 312. The soundbar display 312 may display information, for example, surround sound status and power state of the soundbar 108. The television interface 308 may be a HDMI interface that accepts a HDMI cable 114 of FIG. 1. The HDMI cable may be connected to a television 112 or other display device. Thus, the multitude of cables and wires that were traditionally connected to a television has been reduced to one cable, such as an HDMI cable. The speaker array 310 may be a 5.1 surround sound speaker array with speakers for the right rear, left rear, center, right front and left front. The speaker array 310 may also have a wireless transmitter 314, such as a 900 Mhz transmitter for transmitting audio signals to an external subwoofer (not shown).

The wireless HDMI transmitter 210 and HDMI receiver 304 may be implemented as transceiver in other implementations. The transceivers would enable two-way communication over control channels, such as HDMI back channels. The control data would be generated and processed by the respective controller (206 and 306) in the headunit 102 and soundbar 108.

Figure 4:
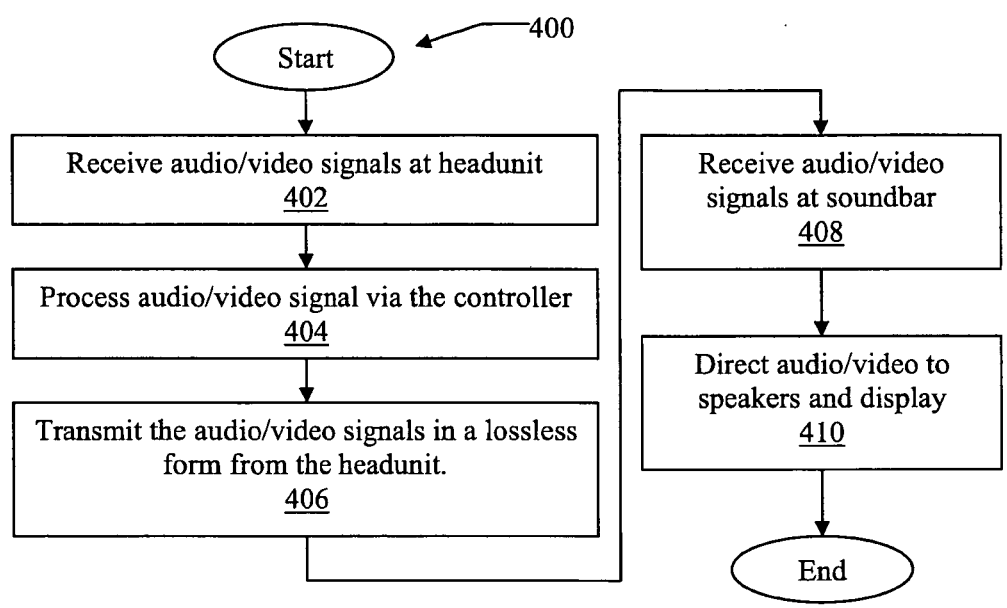
FIG. 4 is a flow diagram of the wireless theater approach of FIGS. 1-3 in accordance with an example implementation.

Turning to FIG. 4, a flow diagram 400 of the wireless theater approach of FIGS. 1-3 in accordance with an example implementation is shown. Audio/video signals, such as the HDMI signals from a Blue-Ray disc player, may be received 402 at the head unit 102. The controller 206 processes the audio/video signals 404 and transmits the audio/video signals as raw video signals (such as encapsulated H.264 data) and audio 406 from the headunit 102, via wireless HDMI transmitter 210 and antenna 212. The soundbar 108 receives the wireless audio/video signals 408 at antenna 302 and wireless HDMI receiver 304. The controller then directs the audio/video to speakers and the television 410. The flow diagram is shown as having a start and stop position, but in practice the process may be continuous as long as the headunit 102 and sound bar 108 are powered on and active.

It will be understood, and is appreciated by persons skilled in the art, that one or more processes, sub-processes, or process steps described in connection with FIG. 4 may be performed by hardware and/or software. If the process is performed by software, the software may reside in software memory (not shown) in a suitable electronic processing component or system such as, one or more of the functional components or modules schematically depicted in FIGS. 1-3. The software in software memory may include an ordered listing of executable instructions for implementing logical functions (that is, "logic" that may be implemented either in digital form such as digital circuitry or source code or in analog form such as analog circuitry or an analog source such as an analog electrical, audio or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer disk (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An audio/visual system comprising:
a headunit having a wireless transmitter configured to transmit wireless signals encoding a lossless protocol for audio and video signals, an audio/video (AV) input configured to receive audio and video signals from at least one device, a network interface configured to connect to a local or wide area network, and a headunit controller coupled to the network interface, the AV inputs, and the wireless transmitter, the controller processing signals from the AV input and providing the signals to the wireless transmitter; and
a soundbar having a wireless receiver configured to receive the wireless signals from the headunit, a speaker array, a television interface, and a controller coupled to the wireless receiver, the speaker array, and the television interface, the controller configured to provide an encrypted AV signal to the television interface based on the wireless signals from the headunit.

2. The system of claim 1 wherein the transmitter of the headunit is configured to transmit wireless HDMI signals.

3. The system of claim 1 wherein the headunit further comprises a display in communication with the controller and configured to display status of the headunit.

4. The system of claim 1 wherein the soundbar comprises a wireless transmitter coupled to the speaker array.

5. The system of claim 1 wherein the soundbar controller is configured to generate an on-screen menu and provide corresponding signals to the television interface.

6. The system of claim 1 wherein the soundbar is configured to provide an encrypted AV signal to the television interface in response to receiving the wireless signals from the headunit.

7. The system of claim 1 wherein the wireless transmitter of the headunit has a bandwidth of at least 60 GHz.

8. The system of claim 1 wherein the soundbar further comprises a display in communication with the controller of the soundbar.

9. The system of claim 1 wherein the speaker array of the soundbar comprises a left speaker, a center speaker, and a right speaker.

10. An audio/visual (A/V) system, comprising:
a headunit including:
a network interface configured for connection to a local or wide area computer network;
an A/V switch configured to select signals from one of a plurality of A/V inputs for input to the headunit;
a display configured to display headunit status information;
a wireless transmitter for transmitting wireless signals having a bandwidth of at least 60 GHz; and
a controller in communication with the network interface, the A/V switch, the display, and the wireless transmitter, the controller providing signals from the A/V switch for lossless wireless transmission by the wireless transmitter; and
a soundbar including:
a wireless receiver configured to receive wireless signals from the wireless transmitter of the headunit having a bandwidth of at least 60 GHz;
a soundbar display;
a television interface;
a speaker array; and
a controller in communication with the wireless receiver, the soundbar display, the television interface, and the speaker array, the controller configured to process signals from the wireless receiver to provide audio signals to the speaker array and video signals to the television interface.

11. The system of claim 10 wherein the transmitter of the headunit is configured to transmit wireless HDMI signals.

12. The system of claim 10 wherein the speaker array of the soundbar comprises a left speaker, a center speaker, and a right speaker.

13. The system of claim 10 wherein the transmitter of the headunit is configured to transmit signals using a lossless protocol.

14. The system of claim 10 wherein the television interface comprises an HDMI compatible port.

15. A method comprising:
receiving audio/visual input signals from at least one of multiple A/V devices coupled by a wires to a headunit;
switching, selectively, between multiple audio/visual input signals from multiple A/V devices coupled by wire to a headunit;
wirelessly transmitting an audio/visual (A/V) signal having a bandwidth exceeding 60 GHz from the headunit using a lossless protocol, the A/V signal being generated in response to receiving the audio/visual input signals from at least one of the multiple A/V devices;
receiving the wirelessly transmitted A/V signals in a soundbar having a controller coupled to a speaker array; and
processing the received A/V signals to generate an audio signal provided to the speaker array and a video signal provided to a television interface of the soundbar.

16. The method of claim 15 wherein wirelessly transmitting comprises wirelessly transmitting using a wireless HDMI protocol.

17. The method of claim 15 wherein the video signal comprises an HDMI compatible signal.

18. The method of claim 15 wherein the television interface comprises an HDMI compatible interface.

19. The method of claim 15 wherein wirelessly transmitting comprises wirelessly transmitting using a lossless protocol.

20. The method of claim 15 wherein the television interface is configured to receive a wired HDMI plug.

* * * * *